United States Patent
Lewis et al.

(10) Patent No.: US 10,569,976 B2
(45) Date of Patent: Feb. 25, 2020

(54) SYSTEMS, DEVICES, AND METHODS FOR AUTOMATED PALLET AND RECEPTACLE RELOCATION

(71) Applicant: Walmart Apollo, LLC, Bentonville, AR (US)

(72) Inventors: Steven Jackson Lewis, Bentonville, AR (US); George Burdine, Bentonville, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 15/944,496

(22) Filed: Apr. 3, 2018

(65) Prior Publication Data

US 2018/0290844 A1   Oct. 11, 2018

Related U.S. Application Data (60) Provisional application No. 62/482,957, filed on Apr. 7, 2017.

(51) Int. Cl.
  *B65G 67/04*   (2006.01)
  *B60P 1/02*   (2006.01)
  (Continued)

(52) U.S. Cl.
  CPC ............... *B65G 67/04* (2013.01); *B60P 1/00* (2013.01); *B60P 1/022* (2013.01); *B65D 25/10* (2013.01);
  (Continued)

(58) Field of Classification Search
  CPC .......... B60P 1/022; B65G 21/14; B65G 67/04
  See application file for complete search history.

(56) References Cited

U.S. PATENT DOCUMENTS 3,596,785 A * 8/1971 Weatherford, Jr. .... B65G 21/14
                                                            198/812
3,613,910 A    10/1971 Weir
(Continued)

FOREIGN PATENT DOCUMENTS

WO    2009107084 A1    9/2009

OTHER PUBLICATIONS

International Search Report and Written Opinion from related international patent application No. PCT/US2018/025882 dated Jun. 25, 2018.

*Primary Examiner* — Thomas Randazzo
(74) *Attorney, Agent, or Firm* — McCarter & English, LLP; David R. Burns (57) ABSTRACT

Methodologies, systems, and computer-readable media are provided for relocating pallets and receptacles. A shipping motor vehicle has a weight sensor within a cargo area that measures a weight of a pallet or a receptacle. A location sensor located within the cargo area identifies available storage locations within the cargo area, and a computing device equipped with a processor computes a destination location within the cargo area for the pallet or receptacle based, at least in part, on the weight of the pallet or receptacle measured by the weight sensor. An internal conveyor system located within the shipping motor vehicle receives the pallet or receptacle from an external conveyor system and automatically relocates the pallet or receptacle to the destination location within the cargo area.

20 Claims, 5 Drawing Sheets

(51) Int. Cl.

| | |
|---|---|
| *G01G 23/18* | (2006.01) |
| *B65D 90/51* | (2019.01) |
| *B65D 25/10* | (2006.01) |
| *B60P 1/00* | (2006.01) |
| *B65G 43/00* | (2006.01) |
| *G05D 3/20* | (2006.01) |
| *B65G 69/28* | (2006.01) |
| *H04W 4/38* | (2018.01) |
| *G01G 19/08* | (2006.01) |
| *B65G 43/08* | (2006.01) |
| *B65G 21/14* | (2006.01) |
| *G06Q 10/08* | (2012.01) |

(52) U.S. Cl.
CPC ............ *B65D 90/51* (2019.02); *B65G 21/14* (2013.01); *B65G 43/00* (2013.01); *B65G 43/08* (2013.01); *B65G 69/287* (2013.01); *G01G 19/08* (2013.01); *G01G 23/18* (2013.01); *G05D 3/20* (2013.01); *G06Q 10/083* (2013.01); *H04W 4/38* (2018.02); *B65G 2201/02* (2013.01); *B65G 2203/0283* (2013.01); *B65G 2203/042* (2013.01); *B65G 2207/14* (2013.01); *B65G 2814/0344* (2013.01)

(56) References Cited

U.S. PATENT DOCUMENTS

| | | | |
|---|---|---|---|
| 4,181,460 A | 1/1980 | Lutz | |
| 5,478,189 A | 12/1995 | Agtuca | |
| 5,803,699 A | 9/1998 | Pinkston | |
| 5,829,947 A | 11/1998 | Litten | |
| 7,534,082 B2 | 5/2009 | Rawdon et al. | |
| 7,588,406 B2 | 9/2009 | Frankel | |
| 8,764,371 B2 | 7/2014 | Whitfield, Jr. et al. | |
| 9,251,417 B1 | 2/2016 | Xu et al. | |
| 9,399,557 B1* | 7/2016 | Mishra | B65G 43/00 |
| 9,457,970 B1* | 10/2016 | Zevenbergen | B65G 67/02 |
| 2010/0294624 A1 | 11/2010 | Warner | |
| 2012/0160637 A1* | 6/2012 | Itoh | B65G 1/023 |
| | | | 198/784 |
| 2013/0313076 A1* | 11/2013 | Stelter | B64F 1/32 |
| | | | 198/611 |
| 2014/0158497 A1* | 6/2014 | Bogle | B65G 15/42 |
| | | | 198/341.07 |
| 2015/0210199 A1* | 7/2015 | Payne | G06Q 10/08 |
| | | | 701/1 |
| 2015/0345865 A1* | 12/2015 | Rivera | B65G 39/18 |
| | | | 198/572 |
| 2016/0068344 A1* | 3/2016 | Mast | B65G 21/10 |
| | | | 198/463.1 |
| 2016/0090248 A1 | 3/2016 | Worsley et al. | |
| 2016/0221768 A1* | 8/2016 | Kadaba | B65G 67/04 |
| 2016/0239802 A1* | 8/2016 | Burch, V | H04W 4/70 |
| 2017/0107056 A1* | 4/2017 | Kadaba | B65G 67/04 |
| 2017/0220980 A1* | 8/2017 | Jones | G01G 19/387 |
| 2018/0178797 A1* | 6/2018 | Seaman | B60W 30/02 |

\* cited by examiner

SYSTEMS, DEVICES, AND METHODS FOR AUTOMATED PALLET AND RECEPTACLE RELOCATION

RELATED APPLICATIONS

This application claims priority to U.S. Provisional Patent Application No. 62/482,957 entitled "SYSTEMS, DEVICES, AND METHODS FOR AUTOMATED PALLET AND RECEPTACLE RELOCATION" filed on Apr. 7, 2017, the content of which is hereby incorporated by reference in its entirety.

BACKGROUND

Pallets and other receptacles for holding items can be relocated and transported using various shipping techniques. Transporting these pallets and receptacles sometimes involves the use of trucks and intermodal containers.

SUMMARY

Embodiments of the present invention disclose a shipping motor vehicle system for relocating pallets and receptacles. The system includes a shipping motor vehicle having a weight sensor within a cargo area that is configured to measure a weight of a pallet or a receptacle. The shipping motor vehicle also includes a location sensor located within the cargo area and configured to identify available storage locations within the cargo area. The shipping motor vehicle further includes a computing device equipped with a processor and configured to compute a destination location within the cargo area for the pallet or receptacle from the identified available storage locations, based, at least in part, on the weight of the pallet or receptacle measured by the weight sensor. The shipping motor vehicle also includes an internal conveyor system located within the shipping motor vehicle and an external conveyor system configured to convey the pallet or receptacle into the shipping motor vehicle. The external conveyor system may include a lifting ramp configured to raise the pallet or receptacle to match a height of the shipping motor vehicle. The internal conveyor system is communicatively coupled to the computing device and configured to receive the pallet or receptacle from the external conveyor system and relocate the pallet or receptacle to the destination location within the cargo area of the shipping motor vehicle.

Additional combinations and/or permutations of the above examples are envisioned as being within the scope of the present disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings are primarily for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

The foregoing and other features and advantages provided by the present invention will be more fully understood from the following description of exemplary embodiments when read together with the accompanying drawings, in which.

DETAILED DESCRIPTION

Following below are more detailed descriptions of various concepts related to, and embodiments of, inventive methods, apparatus, and systems for automatically relocating pallets and receptacles. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means "includes but is not limited to", the term "including" means "including but not limited to". The term "based on" means "based at least in part on".

Methodologies, systems, apparatus, and non-transitory computer-readable media are described herein to facilitate automatically relocating objects on pallets or other receptacles within cargo areas. In exemplary embodiments, weight sensors can be incorporated within a conveyor system in order to measure the weight of a pallet or receptacle, such as but not limited to a box or a crate, and location sensors can identify available locations within a cargo area of a shipping vehicle where the pallet or receptacle can be relocated. It should be appreciated that the description contained further herein may alternately refer to the relocation of only a pallet or receptacle for ease of explanation but that such description should be understood to apply to both pallets and receptacles. The location sensors can be, for example, infrared sensors disposed throughout the cargo area. Once the available locations are identified, a computing system can determine a destination location for the pallet from the available locations. In exemplary embodiments, the destination location can be determined based on the weight of the pallet in order to provide proper weight distribution within the cargo area. The destination location can also be determined based on the expected route of the vehicle in order to account for the turns and topography of the shipping route, in some embodiments. Once the destination location is determined, a conveyor system within the cargo area, such as a conveyor belt or a chain conveyor system, can automatically relocate the pallet to the destination location. In some embodiments, the location sensors can also verify whether the pallet has been properly positioned at the destination location. In exemplary embodiments, the weight sensors can be used to verify the overall weight of a cargo area based on the measured weight of the pallets and receptacles within the cargo area.

In exemplary embodiments, the cargo area is a cargo area of a removable intermodal container resting on a truck bed or a train car. In other embodiments, the cargo area may be integrated into the truck or other shipping vehicle. The term shipping motor vehicle as used herein should be understood to include both a shipping motor vehicle with an integrated cargo area and a shipping motor vehicle transporting an intermodal container.

In one embodiment, the conveyor system within the cargo area of the truck or intermodal container can be in communication with an external conveyor system or lifting ramp that can raise the pallet to the level of the cargo area. The external conveyor system can include a conveyor belt or a chain conveyor system that can communicate with the conveyor system of the cargo area and smoothly transfer the pallet into the cargo area once the pallet is raised to the proper height.

In one exemplary embodiment, the conveyor systems within two cargo areas can be joined together using a conveyor bridge system that can mechanically engage with entry ports of the two cargo areas. The conveyor bridge can also include a conveyor belt or other suitable conveyor system that can transfer pallets between the two cargo areas so that the pallets can be relocated to destination locations within either of the two cargo areas as further described herein.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

Figure 1:
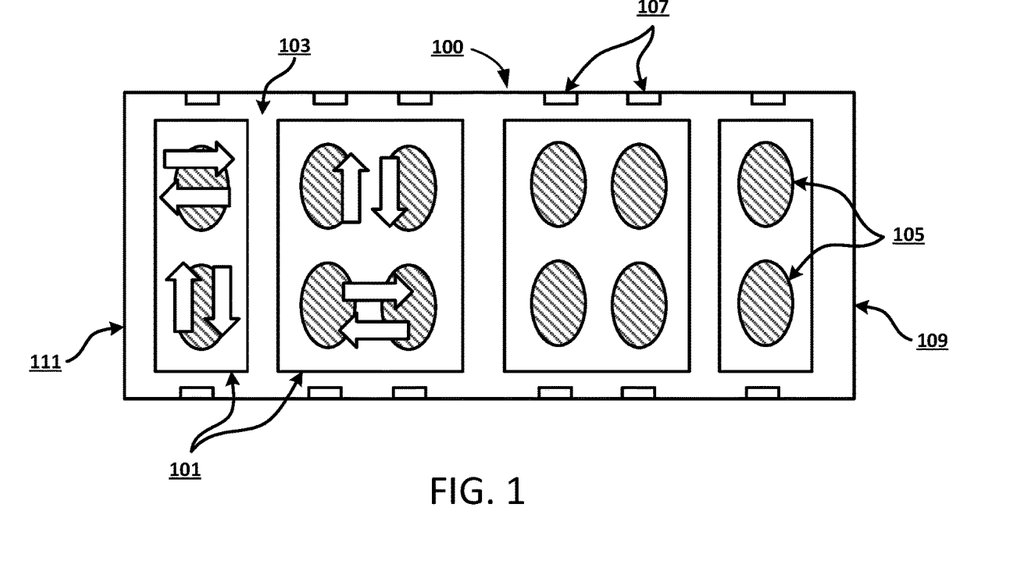
FIG. 1 is a top-down view of a system for relocating pallets and receptacles, according to an exemplary embodiment.

FIG. 1 is a top-down view of a system 100 for relocating pallets and receptacles, according to an exemplary embodiment. In exemplary embodiments, the system 100 includes an internal conveyor system 101, such as a belt conveyor system or a chain conveyor system, disposed within a cargo area 103. The cargo area 103 may be located in an intermodal container or integrated into a shipping motor vehicle. The internal conveyor system 101 can be divided into several portions or segments, such as the four segments illustrated in FIG. 1. The internal conveyor system 101 can be configured to relocate pallets or receptacles in at least four directions, in some embodiments. In exemplary embodiments, weight sensors 105 are distributed throughout the cargo area 103 and are configured to measure the weight of a pallet or receptacle. In some embodiments, the weight sensors 105 can be integrated within the internal conveyor system 101 or in the floor of the cargo area 103 and can measure the weight of the pallet or receptacle as they transit the weigh sensor or come to rest on the weight sensor. The cargo area 103 can also include a number of location sensors 107 configured to identify available storage locations within the cargo area 103. In exemplary embodiments, the location sensors 107 can include one or more infrared sensors disposed throughout the cargo area 103 that are configured to communicate with a computing device in order to determine if a pallet or receptacle is in a pre-determined location.

In exemplary embodiments, the cargo area 103 can have two or more receiving ports 109, 111 such that the internal conveyor system 101 can receive or transmit pallets or receptacles from different directions. In this example embodiment, the receiving ports 109, 111 are located at opposing ends of the cargo area 103 such that the cargo area 103 can be loaded or unloaded from two directions. In another embodiment, a receiving port may be located on the side of the cargo area 103 instead of, or in addition to, being located at one of the respective ends of the cargo area. In some embodiments, the cargo area 103 can also include moisture sensors integrated within the internal conveyor system or located on the floor of the cargo area 103 in order to facilitate monitoring the quality and status of pallets or receptacles. For example, a moisture sensor can detect leaks from items on the pallets or in the receptacles that may damage the system 100 or signify damaged products. In exemplary embodiments, an operator of a shipping motor vehicle can be notified by the moisture sensor via a communicatively coupled computing device when a leak is detected.

Figure 2:
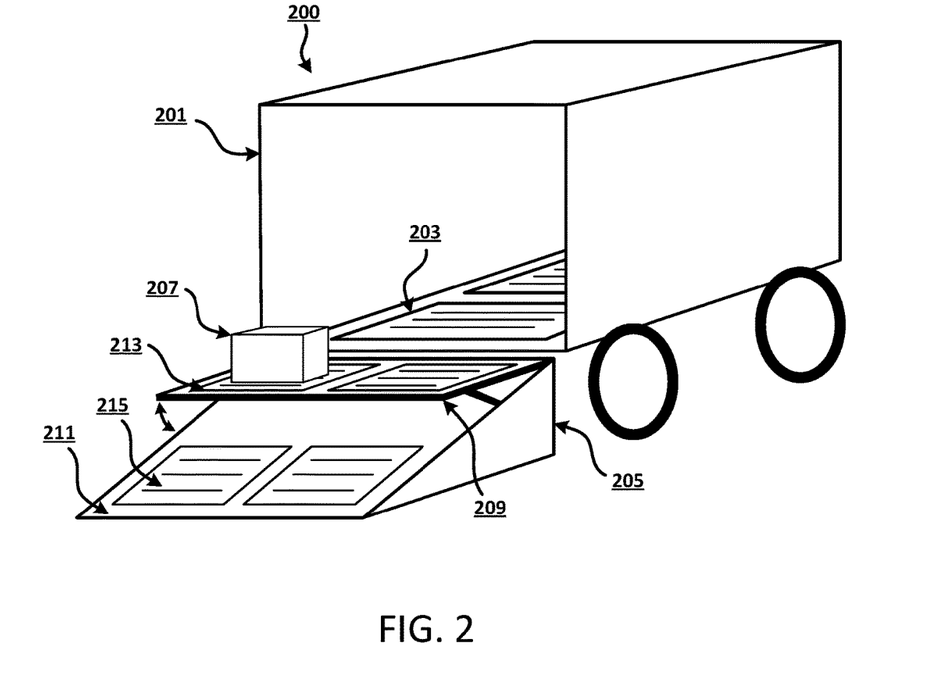
FIG. 2 is a perspective view of a shipping motor vehicle system for relocating pallets and receptacles, according to an exemplary embodiment.

FIG. 2 is a perspective view of a shipping motor vehicle system 200 for relocating pallets and receptacles, according to an exemplary embodiment. In this example embodiment, the system 200 includes an internal conveyor system 203 located within the cargo area of a shipping motor vehicle 201. As discussed above in reference to FIG. 1, the internal conveyor system 203 can be configured to receive a pallet or receptacle 207 and relocate it to a destination location within the shipping motor vehicle 201. In this example embodiment, the system 200 also includes an external conveyor system 205 configured to convey the pallet or receptacle 207 into the shipping motor vehicle 201. The external conveyor system 205 can include, for example, a lifting ramp 211 that can raise the pallet or receptacle 207 to match a height of the internal conveyor system 203 of the shipping motor vehicle 201.

As previously discussed, the shipping motor vehicle 201 can include a cargo truck, a refrigerated truck or other type of motor vehicle with an integrated cargo area. Alternatively the shipping motor vehicle 201 may be a shipping motor vehicle (such as a truck or train segment) configured to receive an intermodal container, etc.

In exemplary embodiments, the external conveyor system can include a platform portion 209 can initially lie flush against the inclined surface of the lifting ramp 211 until the pallet or receptacle 207 is positioned onto a platform conveyor belt 213 integrated within the platform portion 209. In some embodiments, the receptacle can travel up the inclined surface of the lifting ramp, using for example a second conveyor belt 215, until it reaches the platform conveyor belt 213. Once the pallet or receptacle 207 is positioned onto the platform conveyor belt 213, one end of the platform portion 209 can be lifted in order to make the platform portion 209 substantially level with the internal conveyor system 203 of the shipping motor vehicle 201, or parallel to the ground. Once the pallet or receptacle 207 matches the height of the internal conveyor system 203 and is level, the platform conveyor belt 213 can transfer the pallet or receptacle 207 into the shipping motor vehicle 201. As will be appreciated, various types of motors can be used to convey the platform portion 209 along an incline of the lifting ramp 211 to raise it to match the height of the shipping motor vehicle 201. In some embodiments, the platform portion 209 of the external conveyor system 205 can travel along an incline of the lifting ramp 211.

In exemplary embodiments, the internal conveyor system 203 and the external conveyor system 205 are communicatively coupled to one another and can send and receive data relating to their operation in order to properly transfer the receptacle 207 between the conveyor systems 203, 205. In some embodiments, the internal conveyor system 203 and the external conveyor system 205 may be controlled by one or more computing devices that control their operation based on sensed information relating to the pallets and/or receptacles traversing the internal conveyor system 203 and/or external conveyor system 205. For example, the internal conveyor system 203 can receive data relating to the operation of the platform conveyor belt 213 of the external conveyor system 205 in order to receive the pallet or receptacle 207 and relocate the pallet or receptacle 207 to the destination location within the cargo area of the shipping motor vehicle 201. In some embodiments, one or more weight sensors can be integrated within the external conveyor system 205, and a computing device associated with the internal conveyor system 203 and the external conveyor system 205 can receive weight measurements associated with the pallet or receptacle 207. The destination location for the pallet or receptacle 207 can be calculated, in some embodiments, based on the measured weight of the pallet or receptacle 207.

Figure 3:
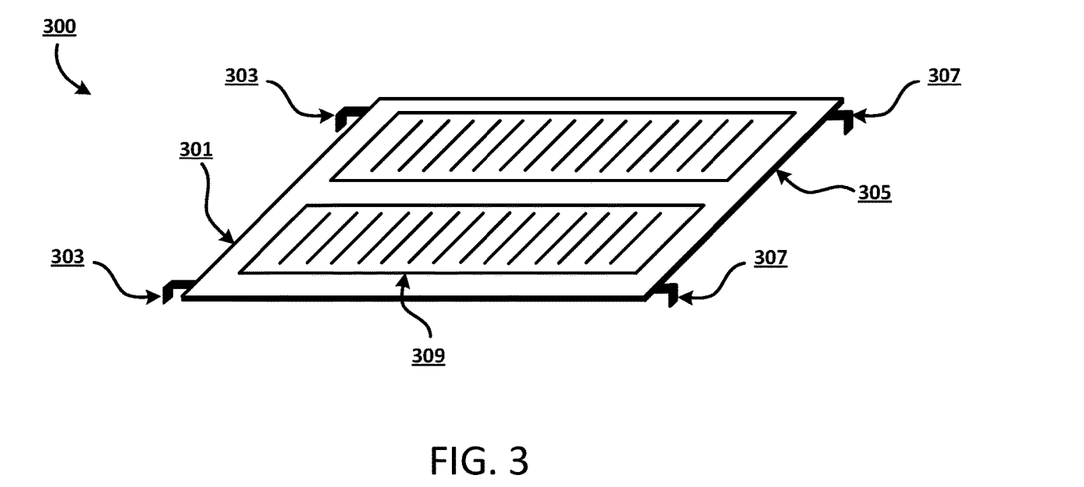
FIG. 3 is a perspective view of a conveyor bridge system for relocating pallets and receptacles, according to an exemplary embodiment.

FIG. 3 is a perspective view of a conveyor bridge system 300 for relocating pallets and receptacles, according to an exemplary embodiment. In exemplary embodiments, the system 300 can be a conveyor bridge that can be used to transfer receptacles and/or pallets between cargo areas. In some embodiments, the conveyor bridge system 300 includes a first end portion 301 configured to mechanically engage with a first receiving port of a first shipping motor vehicle. In this example embodiment, the first end portion 301 includes a first pair of latches 303 configured to mechanically engage with the first shipping motor vehicle. In exemplary embodiments, the conveyor bridge system 300 also includes a second end portion 305 configured to mechanically engage with a second receiving port of a second shipping motor vehicle using a second pair latches 307. In some embodiments, the pairs of latches 303, 307 can include an electrical contact or connection that can interact with a connection on the first and second shipping motor vehicles in order to verify that the conveyor bridge system 300 is properly positioned and mechanically engaged with the vehicles.

In exemplary embodiments, the conveyor bridge system 300 also includes a middle portion disposed between the first end portion 301 and the second end portion 305 that includes a conveyor belt 309 configured to transport a pallet or receptacle between the first end portion 301 and the second end portion 305. In some embodiments, the conveyor belt 309 can transfer receptacles between the respective conveyor systems of the first shipping motor vehicle and the second shipping motor vehicle.

Figure 4:
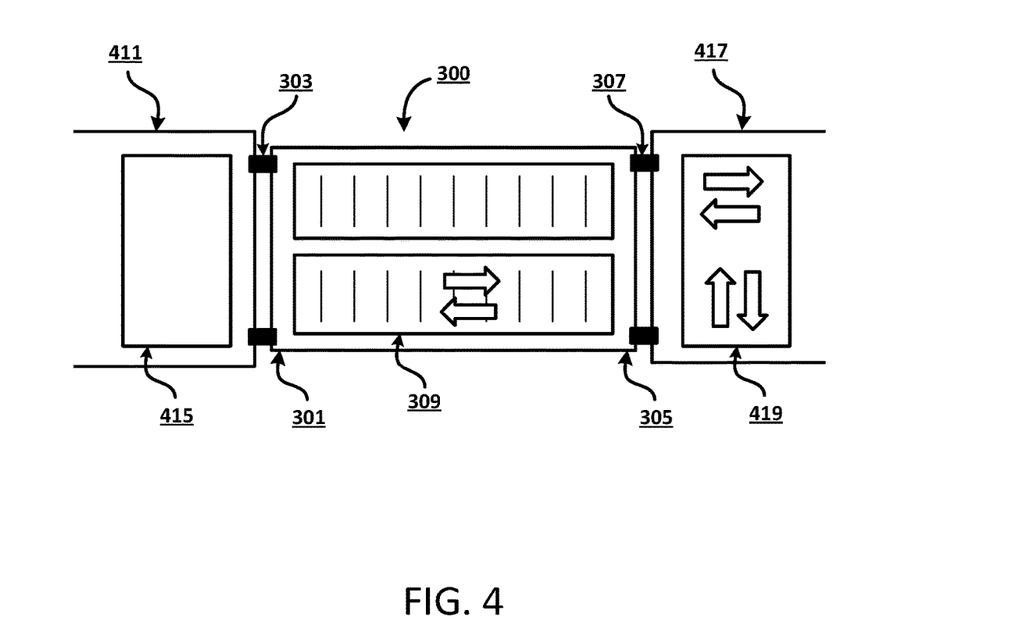
FIG. 4 is a top-down view of the system of FIG. 3, according to an exemplary embodiment.

FIG. 4 is a top-down view of the conveyor bridge system 300 for relocating pallets and receptacles of FIG. 3 connected with a first shipping motor vehicle 411 and a second shipping motor vehicle 417, according to an exemplary embodiment. In this example embodiment, the first end portion 301 is mechanically engaged with the first shipping motor vehicle 411 using the first pair of latches 303, and the second end portion 305 is mechanically engaged with the second shipping motor vehicle 417 using the second pair of latches 307. In exemplary embodiments, once the first end portion 301, the second end portion 305, the first shipping motor vehicle 411, and the second shipping motor vehicle 417 are properly engaged, the conveyor bridge system 300 can form a bridge between the first conveyor system 415 of the first shipping motor vehicle 411 and the second conveyor system 419 of the second shipping motor vehicle 417. In exemplary embodiments, the conveyor belt 309 can transfer pallets to and from the first shipping motor vehicle 411 and the second shipping motor vehicle 417, and can be communicatively coupled with the first conveyor system 415 and the second conveyor system 419. In some embodiments, the conveyor system 300 can communicate with the first shipping motor vehicle 411 and the second shipping motor vehicle 417 to form a mobile distribution center where receptacles or pallets can be relocated to various locations within the vehicles 411, 417. In exemplary embodiments, multiple conveyor systems 300 can be used to operatively connect a number of cargo areas in order to form a network of interconnected cargo areas that can automatically relocate pallets or receptacles to various destination locations.

Figure 5:
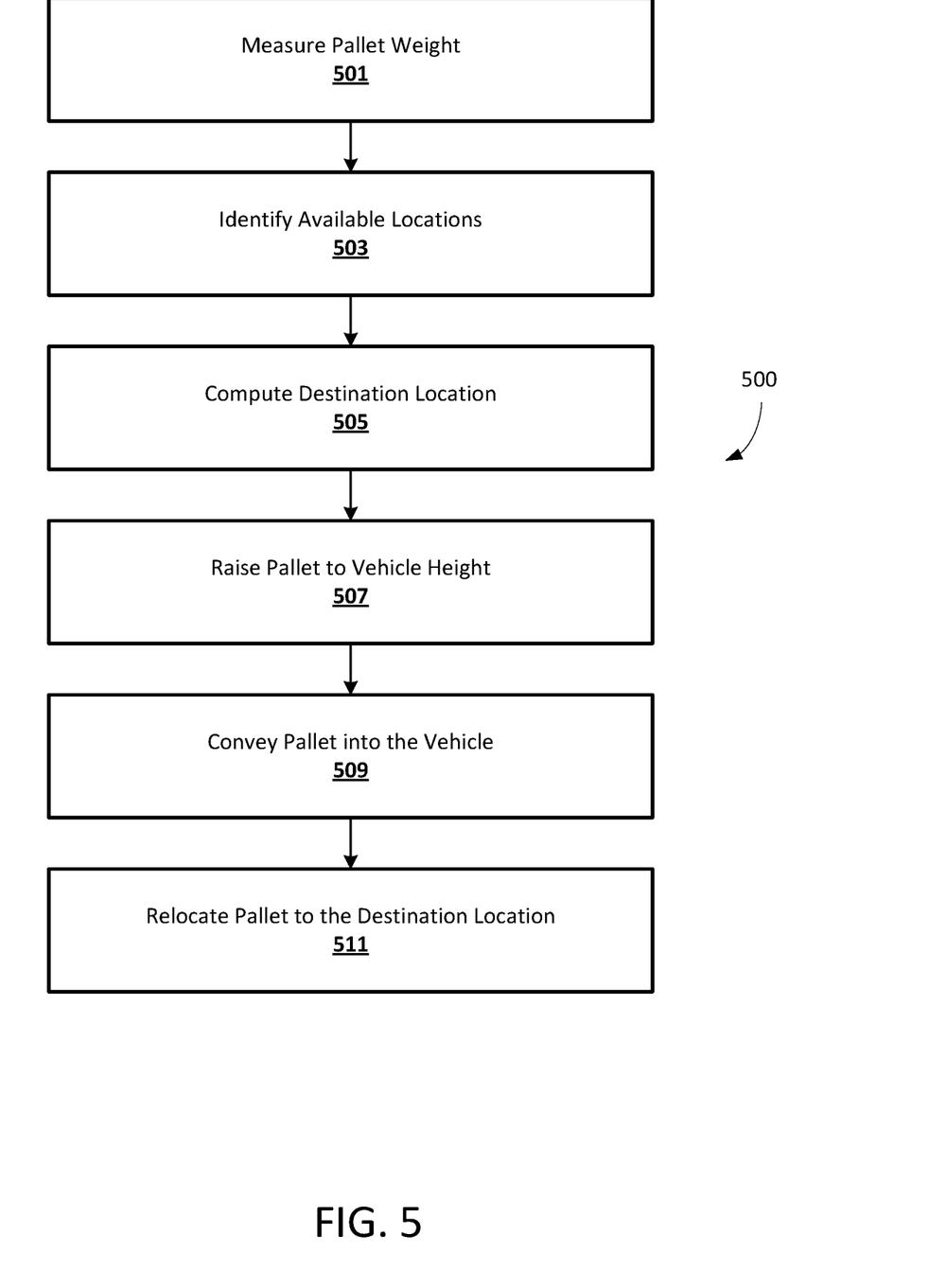
FIG. 5 is a flowchart illustrating an exemplary method for relocating pallets and receptacles, according to an exemplary embodiment.

FIG. 5 is a flowchart illustrating another exemplary method 500 for relocating pallets and receptacles, according to an exemplary embodiment. It will be appreciated that the method is programmatically performed, at least in part, by one or more computer-executable processes executing on, or in communication with one or more servers described further below. In step 501, a weight sensor located within a cargo area measures the weight of a pallet or receptacle. As discussed above, the cargo area can be an integrated cargo area of a shipping motor vehicle or the cargo area of an intermodal container transported by a shipping vehicle. Examples of shipping vehicles that can transport intermodal containers include, but are not limited to, trucks, trains, aircraft and ships. In exemplary embodiments, the weight sensor or weight sensors can be integrated into an internal conveyor system within the cargo area.

In step 503, one or more locations sensors within the cargo area identify available storage locations within the cargo area. In exemplary embodiments, the available storage locations can be identified using infrared sensors distributed throughout the cargo area.

In step 505, a computing device computes a destination location for the pallet or receptacle from among the available storage locations identified in step 503. In exemplary embodiments, the destination location is computed, at least in part, based on the weight of the pallet or receptacle measured by the weight sensor in step 501. In some embodiments, the computing device is located within the cargo area or elsewhere in the shipping motor vehicle, while in other embodiments it is remotely located from the cargo area or shipping motor vehicle and in communication with the weight sensors via a communication channel. In exemplary embodiments, the destination location is computed in order to ensure proper weight distribution of pallets and receptacles within the cargo area. In some embodiments, the destination location is computed based on an expected route of the shipping motor vehicle.

In step 507, a lifting ramp of an external conveyor system raises the pallet or receptacle to match the height of the cargo area or the shipping vehicle. In exemplary embodiments, the external conveyor system includes a platform portion at the top of the lifting ramp that may be pivoted and/or raised to the height of the cargo area, as discussed above in reference to FIG. 2.

In step 509, once the pallet or receptacle is at the height of the cargo area or shipping vehicle, a conveyor belt within the platform portion of the lifting ramp can transfer the pallet or receptacle onto the internal conveyor system within the cargo area.

In step 511, the internal conveyor system relocates the pallet or receptacle to the destination location within the cargo area based on instructions received from the computing device. In exemplary embodiments, the computing device is in communication with the internal conveyor system and can control the operation of the internal conveyor system. In one embodiment, the internal conveyor system includes at least one omnidirectional conveyor belt whose direction of operation is controlled by the computing device. In some embodiments, the size and dimensions of the cargo area can be dependent upon the type of receptacles or pallets that it will transport. For example, the cargo area can be a refrigerated cargo area, in some embodiments. In other embodiments, the cargo area can include multiple levels where receptacles and pallets can be stored above or below one another. In such embodiments, the internal conveyor system can include an elevator or lifting platform that can transport pallets or receptacles between the various levels within the cargo area.

Figure 6:
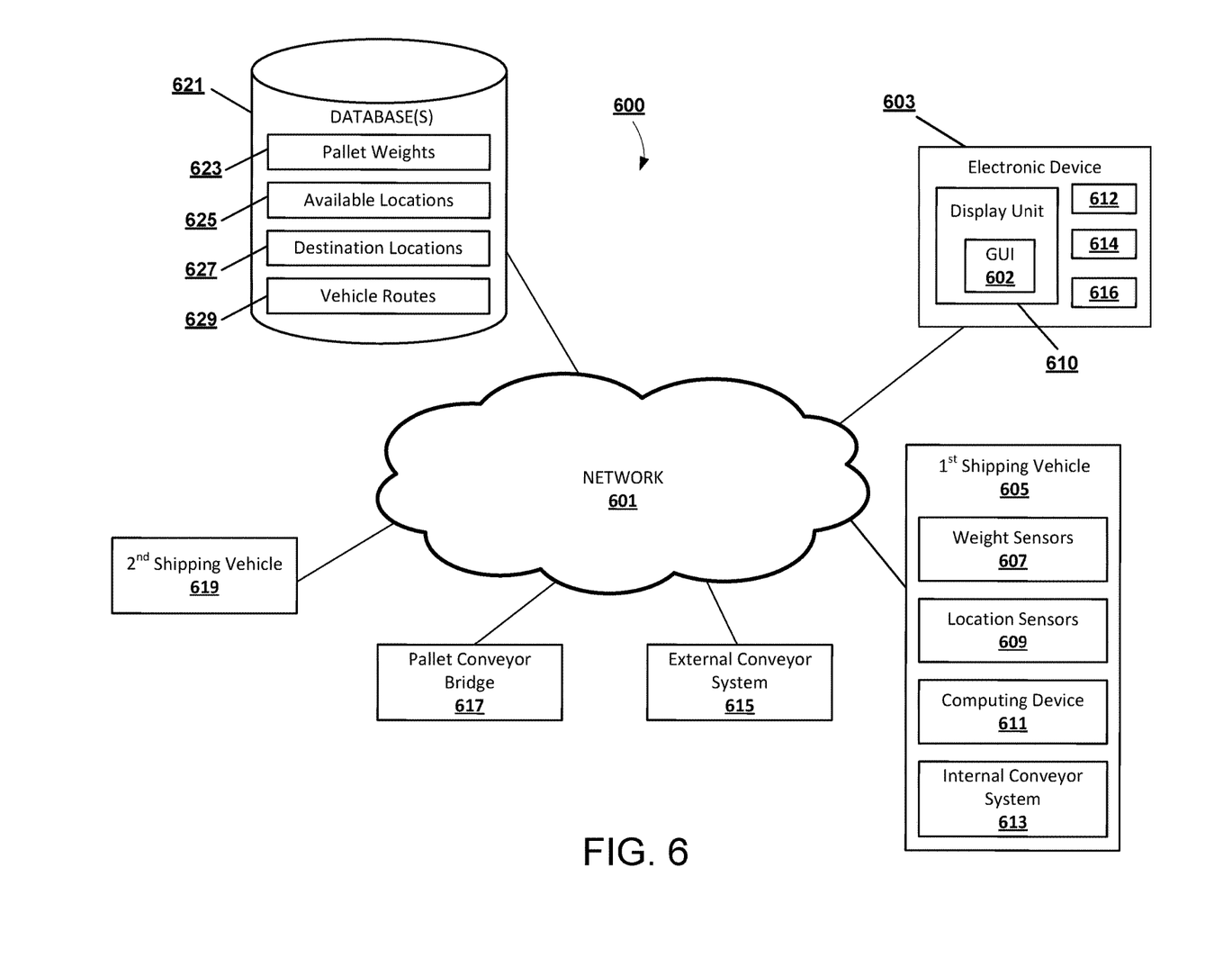
FIG. 6 is a diagram of an exemplary network environment suitable for a distributed implementation of an exemplary embodiment.

FIG. 6 illustrates a network diagram depicting a system 600 suitable for a distributed implementation of an exemplary embodiment. The system 600 can include a network 601, an electronic device 603, a first shipping vehicle 605, an external conveyor system 615, a pallet conveyor bridge 617, a second shipping vehicle 619, and a database 621. As will be appreciated, various distributed or centralized configurations may be implemented without departing from the scope of the present invention. In exemplary embodiments, the first shipping vehicle can include weight sensors 607, location sensors 609, a computing device 611, and an internal conveyor system 613. In some embodiments, the second shipping vehicle 619 can also include weight sensors, location sensors, a computing device, and an internal conveyor system similar to those included in the first shipping vehicle 605. The database 621 can store the pallet weights 623, available locations 625, destination locations 627, and vehicle routes 629, as discussed herein.

In exemplary embodiments, the electronic device 603 may include a display unit 610, which can display a GUI 602 to a user of the electronic device 603. The electronic device can also include a memory 612, processor 614, and a wireless interface 616. In some embodiments, the electronic device 603 may include, but is not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, smartphones, and the like. The electronic device 603 may include some or all components described in relation to computing device 700 shown in FIG. 7.

The electronic device 603 may connect to a network 601 via a wired or wireless connection. The electronic device 603 may include one or more applications such as, but not limited to, a web browser, an object reader application, a geo-location application, and the like. In exemplary embodiments, an individual can use the electronic device 603 to remotely monitor and/or control the operation of the internal conveyor system 613, the external conveyor system 615, or the pallet conveyor bridge 617.

In exemplary embodiments, the electronic device 603, first shipping vehicle 605, external conveyor system 615, pallet conveyor bridge 617, second shipping vehicle 619, and database 621 may be in communication with each other via the communication network 601. The communication network 601 may include, but is not limited to, the Internet, an intranet, a LAN (Local Area Network), a WAN (Wide Area Network), a MAN (Metropolitan Area Network), a wireless network, an optical network, and the like. In one embodiment, the electronic device 603, first shipping vehicle 605, external conveyor system 615, pallet conveyor bridge 617, second shipping vehicle 619, and database 621 can transmit instructions to each other over the communication network 601. In exemplary embodiments, the pallet weights 623, available locations 625, destination locations 627, and vehicle routes 629 can be stored at the database 621 and received at the electronic device 603, first shipping vehicle 605, external conveyor system 615, pallet conveyor bridge 617, second shipping vehicle 619 in response to a service performed by a database retrieval application.

Figure 7:
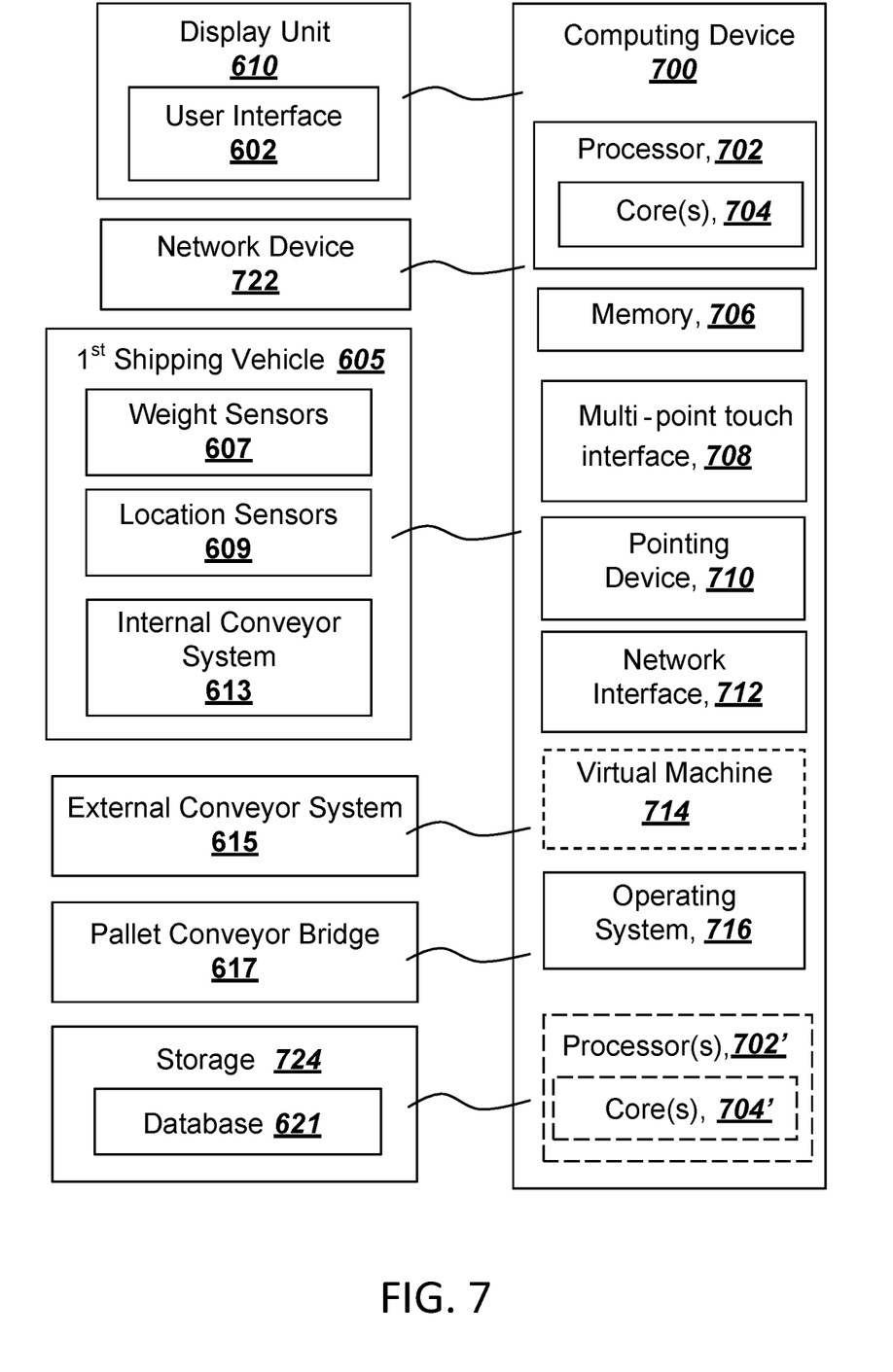
FIG. 7 is a block diagram of an exemplary computing device that can be used to perform exemplary processes in accordance with an exemplary embodiment.

FIG. 7 is a block diagram of an exemplary computing device 700 that can be used in the performance of the methods described herein. The computing device 700 includes one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like.

For example, memory 706 included in the computing device 700 can store computer-readable and computer-executable instructions or software for implementing exemplary embodiments and programmed to perform processes described above in reference to FIG. 5. The computing device 700 also includes processor 702 and associated core 704, and optionally, one or more additional processor(s) 702' and associated core(s) 704' (for example, in the case of computer systems having multiple processors/cores), for executing computer-readable and computer-executable instructions or software stored in the memory 706 and other programs for controlling system hardware. Processor 702 and processor(s) 702' can each be a single core processor or multiple core (704 and 704') processor.

Virtualization can be employed in the computing device 700 so that infrastructure and resources in the computing device can be shared dynamically. A virtual machine 714 can be provided to handle a process running on multiple processors so that the process appears to be using only one computing resource rather than multiple computing resources. Multiple virtual machines can also be used with one processor.

Memory 706 can be non-transitory computer-readable media including a computer system memory or random access memory, such as DRAM, SRAM, EDO RAM, and the like. Memory 706 can include other types of memory as well, or combinations thereof.

A user can interact with the computing device 700 through a display unit 610, such as a touch screen display or computer monitor, which can display one or more user interfaces 602 that can be provided in accordance with exemplary embodiments. The computing device 700 can also include other I/O devices for receiving input from a user, for example, a keyboard or any suitable multi-point touch interface 708, a pointing device 710 (e.g., a pen, stylus, mouse, or trackpad). The multi-point touch interface 708 and the pointing device 710 can be coupled to the display unit 610. The computing device 700 can include other suitable conventional I/O peripherals.

The computing device 700 can also include one or more storage devices 724, such as a hard-drive, CD-ROM, or other non-transitory computer readable media, for storing data and computer-readable instructions and/or software that can implement exemplary embodiments of the methods and systems as taught herein, or portions thereof. Exemplary storage device 724 can also store one or more databases 621 for storing any suitable information required to implement exemplary embodiments. The databases 621 can be updated by a user or automatically at any suitable time to add, delete, or update one or more items in the databases. Exemplary storage device 724 can store one or more databases 621 for storing the pallet weights 623, available locations 625, destination locations 627, and vehicle routes 629, and any other data/information used to implement exemplary embodiments of the systems and methods described herein.

The computing device 700 can also be in communication with a first shipping vehicle 605, an external conveyor system 615, and a pallet conveyor bridge 617, in exemplary embodiments. The first shipping vehicle 605 can include, for example, weight sensors 607 configured to measure the weight of pallets or receptacles, location sensors 609 configured to detect available locations within a cargo area of the first shipping vehicle 605 where the pallets or receptacles can be positioned, and an internal conveyor system 613 configured to relocate the pallets and receptacles to a destination location within the cargo area. In exemplary embodiments, the internal conveyor system 613 can be in communication with the external conveyor system 615 or the pallet conveyor bridge 617 and can be configured to receive a pallet or receptacle from the external conveyor system 615 or the pallet conveyor bridge 617, as discussed above.

The computing device 700 can include a network interface 712 configured to interface via one or more network devices 722 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 712 can include a built-in network adapter, network interface card, PCMCIA network card, card bus network adapter, wireless network adapter, USB network adapter, modem or any other device suitable for interfacing the computing device 700 to any type of network capable of communication and performing the operations described herein. Moreover, the computing device 700 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 700 can run operating system 716, such as versions of the Microsoft® Windows® operating systems, different releases of the Unix and Linux operating systems, versions of the MacOS® for Macintosh computers, embedded operating systems, real-time operating systems, open source operating systems, proprietary operating systems, operating systems for mobile computing devices, or other operating systems capable of running on the computing device and performing the operations described herein. In exemplary embodiments, the operating system 716 can be run in native mode or emulated mode. In an exemplary embodiment, the operating system 716 can be run on one or more cloud machine instances.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methods. One of ordinary skill in the art will recognize that example methods can include more or fewer steps than those illustrated in the example flowcharts, and that the steps in the example flowcharts can be performed in a different order than the order shown in the illustrative flowcharts.

What is claimed is:

1. A shipping motor vehicle system for relocating pallets and receptacles, the system comprising:
   a shipping motor vehicle, comprising:
      a weight sensor within a cargo area of the shipping motor vehicle that is configured to measure a weight of a pallet or a receptacle holding one or more items,
      an infrared location sensor located within the cargo area of the shipping motor vehicle and configured to identify available storage locations within the cargo area of the shipping motor vehicle to store the pallet or receptacle,
      a computing device equipped with a processor and configured to compute a destination location within the cargo area for the pallet or receptacle from the identified available storage locations, based, at least in part, on the weight of the pallet or receptacle measured by the weight sensor, and
      an internal omnidirectional conveyor system located within the shipping motor vehicle whose direction of operation is controlled by the computing device; and
   an external conveyor system configured to convey the pallet or receptacle into the shipping motor vehicle, the external conveyor system including a lifting ramp, the lifting ramp configured to raise the pallet or receptacle to match a height of the shipping motor vehicle;
   wherein the internal omnidirectional conveyor system is communicatively coupled to the computing device and is configured to receive the pallet or receptacle from the external conveyor system and relocate the pallet or receptacle to the destination location within the cargo area of the shipping motor vehicle based on commands received from the computing device.

2. The system of claim 1, wherein the weight sensor is integrated within the internal omnidirectional conveyor system.

3. The system of claim 1, wherein a second weight sensor is integrated within the external conveyor system and the computing device computes the destination location within the cargo area for the pallet or receptacle, based, at least in part, on a measured weight of the pallet or receptacle measured by the second weight sensor.

4. The system of claim 1, wherein the internal omnidirectional conveyor system and the external conveyor system are at least one of a belt conveyor system or chain conveyor system.

5. The system of claim 1, wherein the location sensor includes an infrared sensor integrated into the internal omnidirectional conveyor system.

6. The system of claim 1, wherein the lifting ramp comprises:
 a platform portion configured to receive the pallet or receptacle; and
 a motor configured to relocate the platform portion along an incline to raise the platform portion to match the height of the shipping motor vehicle.

7. The system of claim 1, wherein the computing device is further configured to compute the destination location based on an expected route of the shipping motor vehicle.

8. The system of claim 1, further comprising:
 a moisture sensor integrated into the internal omnidirectional conveyor system.

9. A method for automatically relocating pallets and receptacles within a shipping motor vehicle, comprising:
 measuring a weight of a pallet or receptacle holding one or more items using a weight sensor located within a cargo area of the shipping motor vehicle;
 identifying available storage locations to store the pallet or receptacle within the cargo area of the shipping motor vehicle using an infrared location sensor;
 computing, with a computing device located on the shipping motor vehicle, a destination location for the pallet or receptacle from among the identified available locations, based, at least in part, on a weight of the pallet or receptacle measured by the weight sensor;
 raising the pallet or receptacle to match a height of the shipping motor vehicle using a lifting ramp included within an external conveyor system;
 conveying the pallet or receptacle, using the external conveyor system into the shipping motor vehicle;
 receiving the pallet or receptacle with an internal omnidirectional conveyor system located in the cargo area within the shipping motor vehicle, the internal ominidrectional conveyor system having a direction of operation that is controlled by the computing device; and
 relocating the pallet or receptacle to the destination location using the internal omnidirectional conveyor system based on instructions received from the computing device.

10. The method of claim 9, wherein the available storage locations within the shipping motor vehicle are determined using one or more infrared sensors.

11. The method of claim 9, wherein computing the destination location for the pallet or receptacle is further based on an expected route of the shipping motor vehicle.

12. The method of claim 9, wherein the weight sensor is integrated into the internal omnidirectional conveyor system.

13. The method of claim 9, further comprising verifying the weight of the shipping motor vehicle based on the measured weight of the pallet or receptacle.

14. The method of claim 9, wherein computing the destination location for the pallet or receptacle includes ensuring proper weight distribution of pallets and receptacles within the cargo area of the shipping motor vehicle.

15. A shipping motor vehicle, comprising:
 a weight sensor within a cargo area of the shipping motor vehicle that is configured to measure a weight of a pallet or a receptacle;
 an infrared location sensor located within the cargo area of the shipping motor vehicle and configured to identify available storage locations within the cargo area of the shipping motor vehicle to store the pallet or receptacle;
 a computing device equipped with a processor and configured to compute a destination location within the cargo area for the pallet or receptacle from the identified available storage locations, based, at least in part, on the weight of the pallet or receptacle measured by the weight sensor; and
 an internal ominidirectional conveyor system located within the shipping motor vehicle that is communicatively coupled to the computing device and whose direction of operation is controlled by the computing device, the internal ominidirectional conveyor system configured to receive the pallet or receptacle from an external conveyor system and relocate the pallet or receptacle to the destination location within the cargo area of the shipping motor vehicle based on instructions received from the computing device.

16. The system of claim 15, wherein the weight sensor includes a plurality of weight sensors distributed throughout the cargo area.

17. The system of claim 15, wherein the mobile shipping motor vehicle is configured to receive the pallet or receptacle through at least two receiving ports.

18. The system of claim 15, wherein the computing device is further configured to communicate with the external conveyor system and receive data related to the operation of the external conveyor system.

19. The system of claim 15, wherein at least one of the internal omnidirectional conveyor system and the external conveyor system is a belt conveyor system or a chain conveyor system.

20. A smart storage receptacle for use with a shipping motor vehicle or train, the smart storage receptacle comprising:
 a weight sensor located within the smart storage receptacle that is configured to measure a weight of a pallet or a receptacle;
 an infrared location sensor located within the smart storage receptacle and configured to identify available storage locations within the smart storage receptacle to store the pallet or receptacle;
 a computing device equipped with a processor and configured to compute a destination location within the smart storage receptacle for the pallet or receptacle from the identified available storage locations, based, at least in part, on the weight of the pallet or receptacle measured by the weight sensor; and
 an internal omnidirectional conveyor system located within the smart storage receptacle that is communicatively coupled to the computing device and whose direction of operation is controlled by the computing device, the internal omnidirectional conveyor system configured to receive the pallet or receptacle from an external conveyor system and relocate the pallet or receptacle to the destination location within the smart storage receptacle based on instructions received from the computing device, wherein the smart storage receptacle is configured to be transported by a shipping motor vehicle or train.

\* \* \* \* \*